Figure 1A:
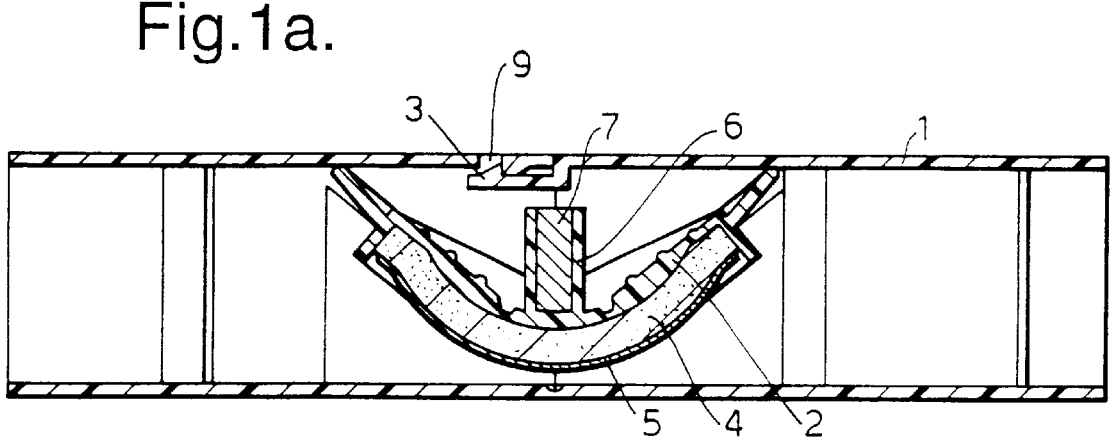

United States Patent [19]
Adams

[11] Patent Number: 5,979,108
[45] Date of Patent: *Nov. 9, 1999

[54] PEST CONTROL DEVICE

[75] Inventor: Andrew John Adams, Bucks, United Kingdom

[73] Assignee: AgrEvo Environment Health Limited, Cambridge, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/765,969

[22] PCT Filed: Jul. 7, 1995

[86] PCT No.: PCT/EP95/02701

§ 371 Date: Jan. 16, 1997

§ 102(e) Date: Jan. 16, 1997

[87] PCT Pub. No.: WO96/02134

PCT Pub. Date: Feb. 1, 1996

[30]     Foreign Application Priority Data

Jul. 18, 1994 [GB]  United Kingdom ............ 9414451

[51] Int. Cl.⁶ ............................................. A01M 25/00
[52] U.S. Cl. ........................................ 43/121; 43/131
[58] Field of Search ................... 43/114, 121, 132.1, 43/108, 131, 107, 61; D22/119, 120, 122; 119/652, 656, 660, 661, 662, 622, 663, 664, 672

[56]     References Cited

U.S. PATENT DOCUMENTS

| | | | |
|---|---|---|---|
| 3,777,716 | 12/1973 | Cortner, Jr. ...................... | 119/672 X |
| 4,709,504 | 12/1987 | Andric ................................. | 43/114 |
| 4,970,822 | 11/1990 | Sherman ............................ | 43/131 |

FOREIGN PATENT DOCUMENTS

| | | |
|---|---|---|
| 0281744 | 9/1988 | European Pat. Off. . |
| 0297214 | 1/1989 | European Pat. Off. . |
| 9222200 | 12/1992 | WIPO . |

*Primary Examiner*—David A. Scherbel
*Assistant Examiner*—Anthony Ojini
*Attorney, Agent, or Firm*—Ostrolenk, Faber, Gerb & Soffen, LLP

[57]     ABSTRACT

A device for controlling crawling pests comprising a tunnel in which the ceiling is treated with a pest control agent and the gap between floor and ceiling in the treated area decreases from at least one edge of the treated area. A pest entering the device receives a topical dose of the pesticide control agent on its upper parts.

32 Claims, 6 Drawing Sheets

LOADING

1  INSERTING REFILL

2  REFILL INSERTING

3  CLOSING HOUSING

UNLOADING

4  INSERT KEY + PRESS

5  OPEN HOUSING + REMOVE REFILL

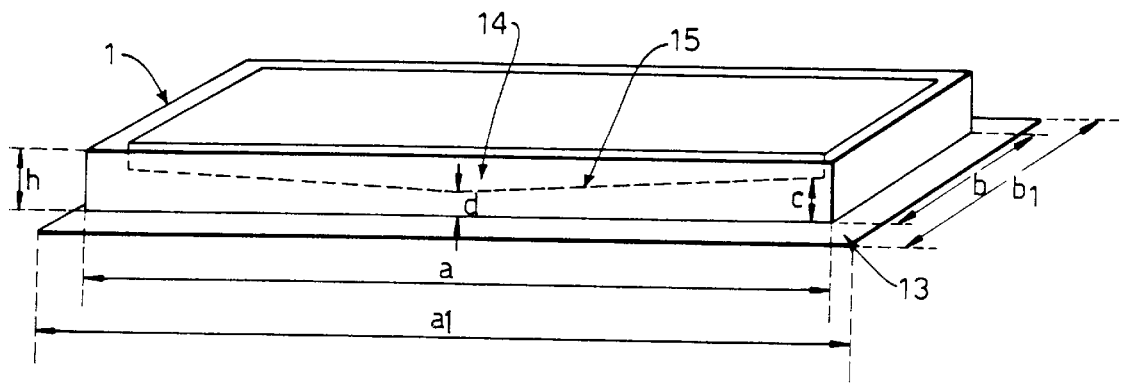
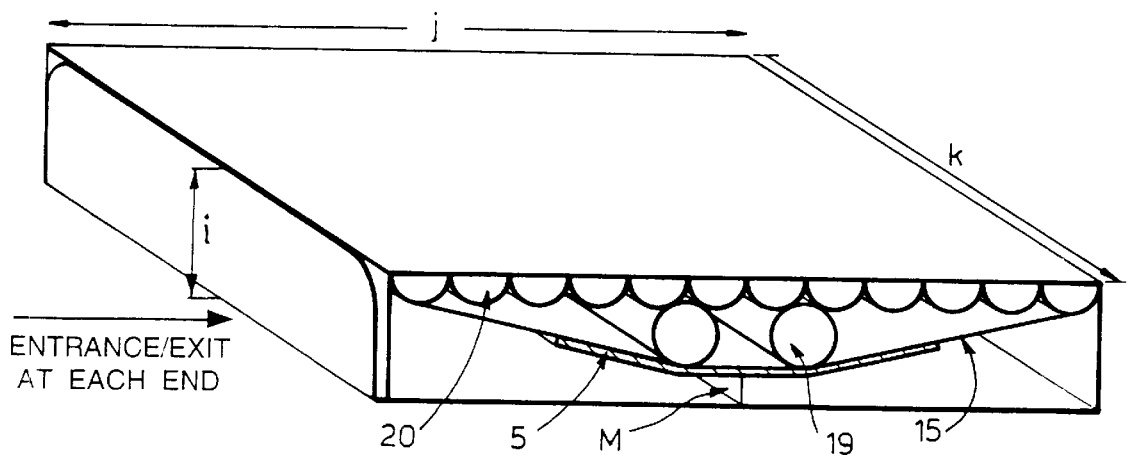

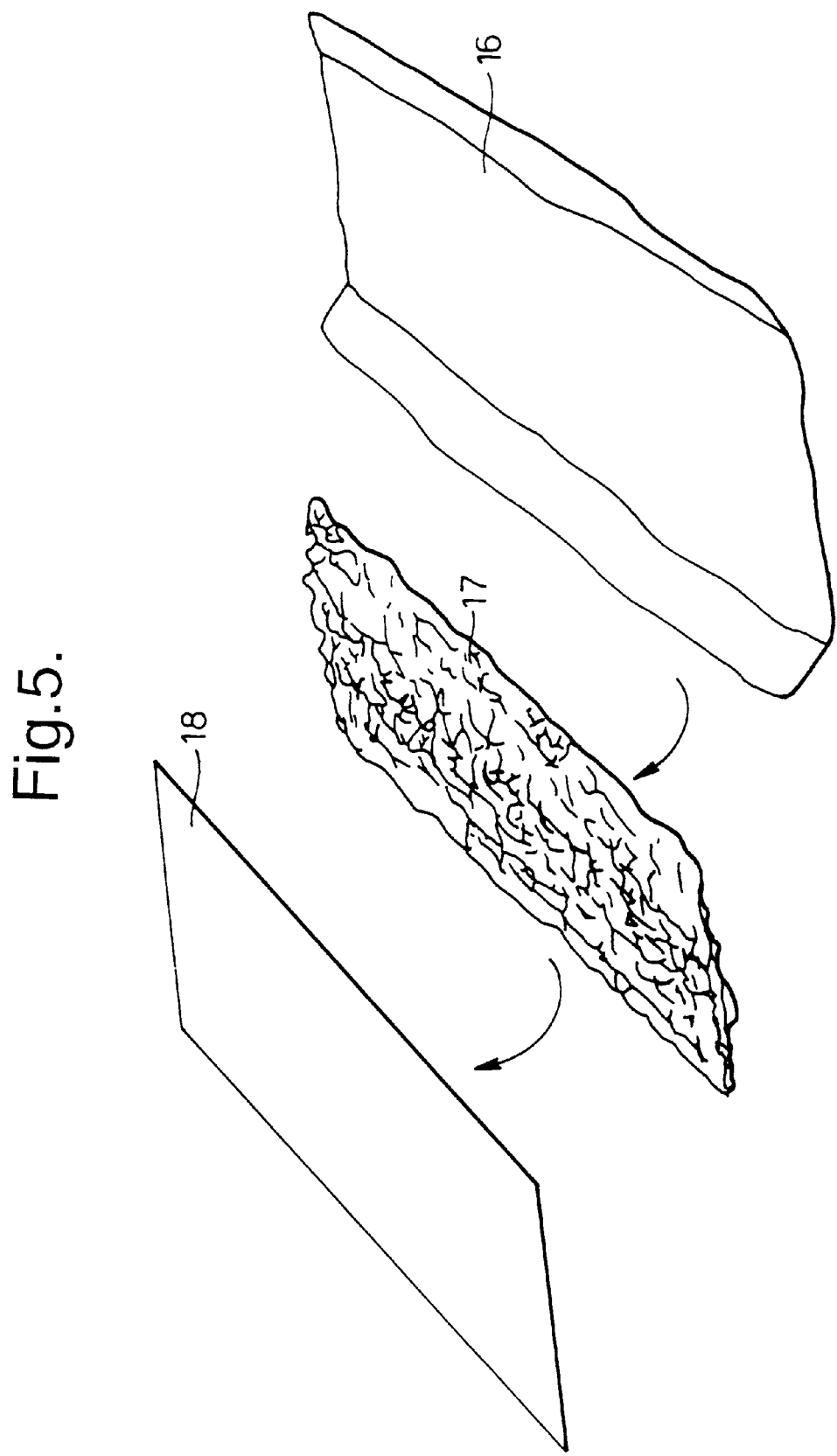

PEST CONTROL DEVICE

The present invention relates to the control of crawling pests, e.g., crawling insects, arachnids, wood lice, millipedes and centipedes, but especially cockroaches. More particularly the invention is concerned with a localized placement device for the control of such pests.

PRIOR ART

Crawling pests have conventionally been controlled by applying a pest control agent to an area, usually by spraying, so that when the target pest crawls over that area it acquires a lethal dose of the agent. However, in this method, humans and non-target creatures can contact the pest control agent, and contamination of foodstuffs or surfaces may occur which could be harmful. Furthermore, the target pest may not stay on a treated area long enough in order to acquire a lethal dose, and this may result in the development of repellency, or resistance, to the agent concerned.

U.S. Pat. No. 4,970,822 describes a contact poison delivery system for cockroaches comprising a tunnel structure having two vertical walls and two horizontal walls defining a poison containment area. An insecticide is applied to the internal horizontal surfaces so that a cockroach walking through the tunnel and contacting those surfaces receives a dose of insecticide. However, the embodiments described are suitable only for the control of cockroaches of a particular size, and we have found that the construction of the device does not allow the insecticide to be transferred even to an insect of appropriate size in a particularly efficient manner. In addition, insecticide is transferred to the legs and feet of the cockroach, and some of this will naturally be deposited on any surface or foodstuffs that it subsequently crosses, resulting in undesirable further contamination. Such contamination is likely to be at sub-lethal levels and, if encountered by other pests, might contribute to the development of resistance. In the region of the device, it could also act to repel further pests from entering the device.

DESCRIPTION

The present invention provides a localised placement device for the control of crawling pests, particularly insects, and especially cockroaches, which reduces or overcomes some of the disadvantages of the prior art.

In one aspect, the present invention provides a device for the control of crawling pests, said device comprising a tunnel into which a crawling pest may enter, characterised in that the interior surface of the tunnel ceiling, or a portion thereof, is treated with a suitable pest control agent, and in that the gap between floor and ceiling in the treated area decreases from at least one edge of the treated area; such that a pest entering the device may encounter said decreasing gap and receive upon contact with the treated surface a dose of the agent topically on its upper parts.

Where the target pest is an insect, the dose is received topically on its antennae, dorsal surfaces of the thorax, abdomen or head.

The floor of the tunnel is preferably formed from a thin layer of a material that does not represent a significant barrier for the pests to cross and enter the device.

The floor of the tunnel is preferably flat, in which case the treated area of the ceiling desirably slopes from opposite edges towards the floor in the direction of the interior of the device to provide the reduction in the floor-to-ceiling gap. For the control of most crawling insects, especially cockroaches, the floor-to-ceiling gap preferably decreases from about 10 mm to about 2 mm, desirably towards the interior of the device. This could alternatively be achieved by means of a flat ceiling and a sloping floor, but this presents a change in environment that is detectable by and may therefore deter the target pests. When a sloping ceiling is used, the change in environment is only detected once the ceiling has been contacted, i.e., once the dose of the pest control agent has been transferred.

In comparison with a device in which the floor and ceiling are parallel, the reducing floor-to-ceiling gap enables a far wider range of sizes of crawling pest to be accommodated and controlled. In addition, it exploits the inherent investigative nature of certain pests, especially cockroaches, which have a propensity to explore small gaps and crevices. To encourage such behavior, and thus increase the contact between the pest and the treated area, at least a small floor-to-ceiling gap is preferably maintained over all or substantially all of the treated area.

A path may be provided for the pest to enter the device at one end and exit at the other, having contacted the treated portion, but this is not essential. Such a path may be imposed on the pest by means of one-way devices at suitable points, particularly one-way entrance and exit doors.

The device of the present invention is not a harbourage or trap, and individual pests generally remain in it for a very short time, typically less than 5 seconds, leaving to die remote from the device once contact with the pest control agent has occurred. In this way the pest control agent may with further advantage be transferred back to the pests' natural harborage or to other pests. Although there may be a consequential transfer of the pest control agent to the environment, this will generally be less than that from known devices in which application is made to the feet or legs.

The tunnel entrance is preferably rectangular in cross-section.

The ceiling is preferably convex. It is also preferably deformable or movable on contact by the target pest, thereby improving or prolonging the contact between the pest and the pest control agent. To this end, a compressible padding material may be located between the interior and exterior surfaces of the ceiling adjacent to the movable/deformable surface. Alternatively, the compressible padding may be replaced by a supporting structure that gives some flexibility to the treated portion of the ceiling. In another embodiment, the treated portion may be a light, deformable, movable structure that is suspended from the ceiling, and is not in contact with the floor of the device.

In a further form of construction, contact with the ceiling, or a structure suspended from it, by the target pest may be made to act as a trigger for a second mechanism to dose the insect.

The treated interior ceiling of the device is desirably removable to enable it to be replenished with pest control agent or replaced.

User exposure to the pest control agent may be limited by the device further comprising, at both ends of the tunnel, a portion of the interior surface of the ceiling which is not treated with the agent. Alternatively, the device may be provided with suitable baffles at each entrance, which should not of course significantly obstruct the target pests from entering the device.

The construction of the device is preferably such that two or more may be linked to form a modular structure.

The device may also beneficially incorporate features attractive to the target pest, for example a dark interior, which has the added advantage of allowing photolabile compounds to be employed which may be of enhanced activity. In addition, the device may of course contain pheromones or foodstuffs.

The pest control agent is preferably applied to the tunnel ceiling in a 1–500 µm thick film of a suitable formulation. The formulation itself is desirably such that it adheres to the tunnel ceiling without soaking into, migrating on, or dripping from it, does not flow at rest, is physically and chemically stable for several months under the conditions of use, and becomes flowable under small shear stress so as to be readily and consistently transferred to the upper surface of the pest whilst rapidly regaining its original structure and viscosity under no-shear conditions. The amount of formulation transferred in the contact is preferably adequate to provide a lethal dose on single contact, but small enough that sufficient remains to ensure the device continues to be effective against further pests. In addition, the formulation should not be repellent to the target pests.

Formulations which may exhibit these properties are typically greases, pastes, gels or creams, and will most frequently comprise one or more pest control agents, optionally a synergist, a gelling/structuring agent, and one or more thickeners, stabilizers, solvents and cosolvents.

The pest control agent may for example be an insecticide, sterilizing agent, growth regulator, juvenile hormone analogue or behavior modifier. Particularly preferred are the synthetic pyrethroid insecticides, e.g., acrinathrin, allethrin (such as D-allethrin), benfluthrin, bifenthrin, bioallethrin, S-bioallethrin, esbiothrin, esbiol, bioresmethrin, cycloprothrin, cyfluthrin, beta-cyfluthrin, cyhalothrin, lambda-cyhalothrin, cypermethrin, alpha-cypermethrin, beta-cypermethrin, cyphenothrin, deltamethrin, empenthrin, esfenvalerate, fenpropathrin, fenvalerate, flucythrinate, tau-fluvalinate, kadethrin, permethrin, phenothrin, prallethrin, imiprothrin, resmethrin, tefluthrin, tetramethrin or tralomethrin. Among these compounds deltamethrin is especially useful.

The activity of the insecticide may be enhanced by the addition of a synergist or potentiator, for example one of the oxidase inhibitor class of synergists such as piperonyl butoxide or propyl 2-propynylphenyl phosphonate.

The gelling/structuring agent can be a bentonite, a modified clay or silica, such as BARAGEL 3000 from Redland Minerals Ltd., zinc stearate or any mixture of a salt and a surfactant able to produce a gel.

The viscosity of the formulation, under no-shear conditions, is preferably greater than or equal to 15,000 mPa secs at a temperature between 10 and 35° C. On contact with a pest, the formulations should preferably shear to a viscosity of no less than about 1000 mPa sec.

The thickener, an ingredient able to increase the viscosity of the product, typically consists of a hydrocarbon wax with more than 18 carbons length and soluble in the vehicle i.e., the liquid phase made by the solvents and co-solvents; an example of such an ingredient is LUNACERA MW from Industrial Waxes Limited.

The solvent or vehicle preferably has a boiling range greater than 280° C at atmospheric pressure, e.g., a mineral white oil such as ONDINA 15, a heavy hydrocarbon solvent such as BVA XK3, a vegetable oil, hydrogenated or methylated or not modified, MIGLYOL oils like 812N. Solvents or vehicles without odor and repellent effect are preferable.

Co-solvents can be used to help solubilization of the active ingredient and can be, for example, selected from ketones, glycol ethers, and glycol esters.

Stabilizers when necessary are selected from anti-oxidants such as BHT, BHA, propyl-gallate, and acidifying agents like citric acid, acetic acid or salts from the dodecylbenzene sulfonic acids.

Preferred formulations for use in the device of the present invention comprise:

| | % w/w |
|---|---|
| Active ingredient (insecticide) | 0.01–80 |
| Gelling/structuring agent | 0.00–30 |
| Thickener | 0.00–30 |
| Stabilizers | 0.00–10 |
| Solvents | 10.00–80 |

Where the active ingredient is deltamethrin, its content in the formulation is preferably from 0.01 to 30% w/w preferably 1 to 10%, and more particularly 2 to 7% w/w.

A specific preferred formulation may be prepared from the following ingredients:

| | % w/w |
|---|---|
| Deltamethrin | 5 |
| MIGLYOL 812 N | 63.9 |
| Citric acid | 0.1 |
| Calcium Phenylsulfonate | 1 |
| LUNACERA MW | 20 |
| BARAGEL 3000 | 10 | by solubilizing the deltamethrin in the MIGLYOL 812 N with the LUNACERA MW, citric acid and calcium dodecylbenzene sulfonate by stirring at a temperature of 70° C., then dispersing the BARAGEL 3000 using a high shear mixer to obtain a gel having a viscosity around 15,000 mPas at 20° C. and over 500 mPas at 50° C.

The present invention also provides a method for the control of crawling pests, particularly insects, in a specified area by placing one or more of the localized placement devices of the present invention in the infested area, for example domestic house kitchens, restaurant kitchens or food preparation areas.

EXAMPLES

In a non-limiting manner, preferred embodiments of the device of the present invention will now be described with reference to the accompanying drawings in which:

FIG. 1*a* is a cross-sectional side view of a preferred device according to the present invention.

FIG. 1*b* is a diagrammatic partly cut-away perspective view of the device of FIG. 1*a*.

FIG. 2*a*, 2*b* and 2*c* illustrate perspective views of the device of FIGS. 1*a* and 1*b* in use in various orientations.

FIG. 3 illustrates schematically the procedure for the insertion and removal of the refill portion of the device of FIGS. 1*a* and 1*b*.

FIG. 4 is a diagrammatic perspective view of a simple localised treatment device according to the invention.

FIG. 5 is a schematic view of the structure of the interior ceiling of the device of FIG. 4.

FIG. 6 is a diagrammatic perspective view of a simple localized treatment device according to the invention.

In FIGS. 1*a* and 1*b*, a plastic casing (1) forms the walls, roof and base of the device. In use, the device contains within it a refill body (2) formed of plastics material e.g., polypropylene, this refill body being removable to enable its replacement. Locking means (3) engage the two portions of the casing on closure. A simple key pushed into the openings (9) enables the device to be opened. The refill body comprises a deformable substrate (4) of a foam material, which forms the ceiling section of the interior of the device and provides the necessary reduction in the floor-to-ceiling distance. The foam material may also be covered with a thin layer of plastics material, e.g., polypropylene. The surface of the substrate (4) is coated with an insecticidal paste (5). In alternative embodiments, the refill body merely comprises a solid curved structure of plastics material, preferably polypropylene, and the surface is coated with the insect control agent. In the embodiment shown, the refill body also has a region (6) adapted to receive a tablet (7) of attractant to the target insect. The entrance/exit regions of the device incorporate baffles (8) which form maze sections (10). Such sections minimize user accessibility to the treated refill body while providing a minimal barrier to movement of the insect into the device. Ganging fixings (11) and (12) are shown on the external side walls of the device.

Figure 1B:
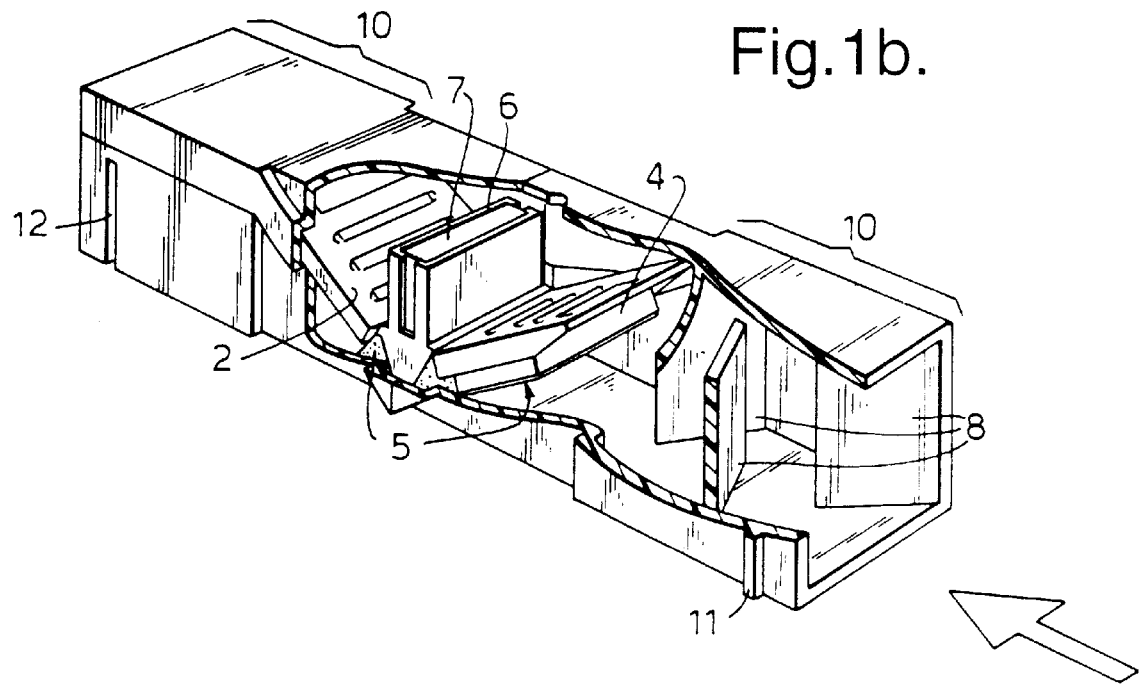

In use, the target insect enters the device in the direction of the arrow shown in FIG. 1b. The sloping ceiling allows for contact by different development stages of the target insect and also permits the insects to progress further into the device until contact with the ceiling and resultant transfer of the insecticide occurs. The smallest development stages of the target insect and also some adults may be able to pass through the device, contacting the treated portion where the floor-to-ceiling distance is at its minimum.

Figure 2A:
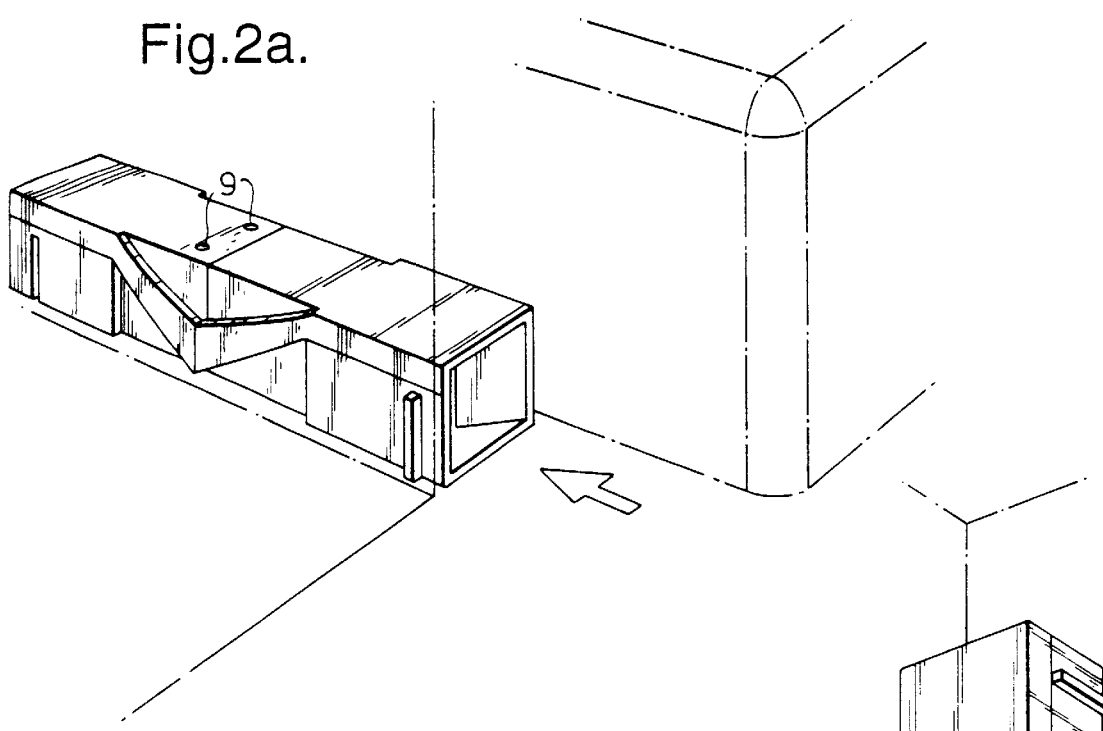
Figure 2B:
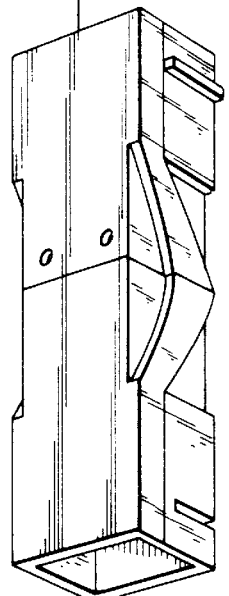
Figure 2C:
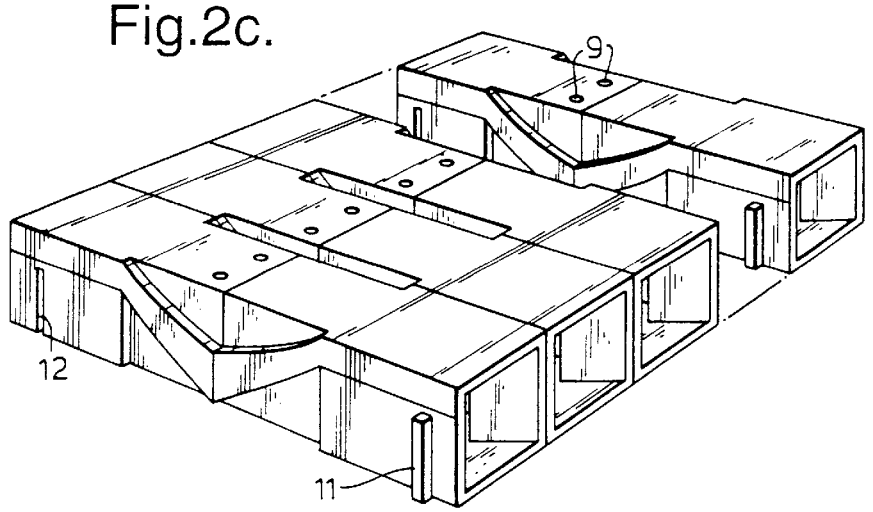

In FIGS. 2a and 2b, the positioning of a device of FIGS. 1a and 1b is illustrated, in a horizontal position and a vertical position respectively. The device is held in the vertical orientation by means of adhesive pads. These are also preferably used for a horizontal positioning to prevent the device from being inadvertently moved. FIG. 2c illustrates the use of several devices fixed together by means of male and female fixings (11) and (12) respectively, thus increasing the overall catchment area.

Figure 3:
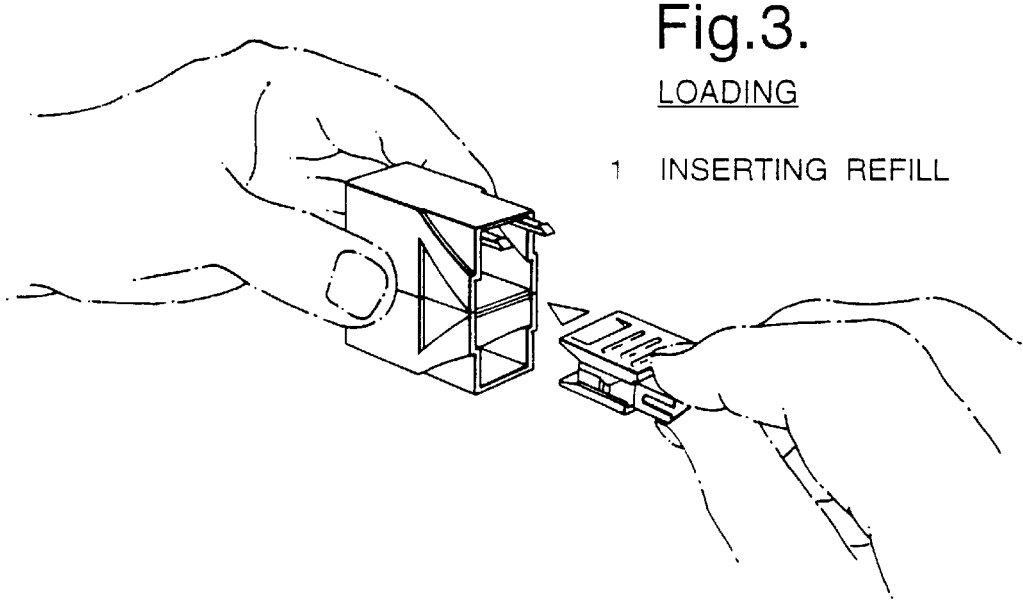
Figure 3:
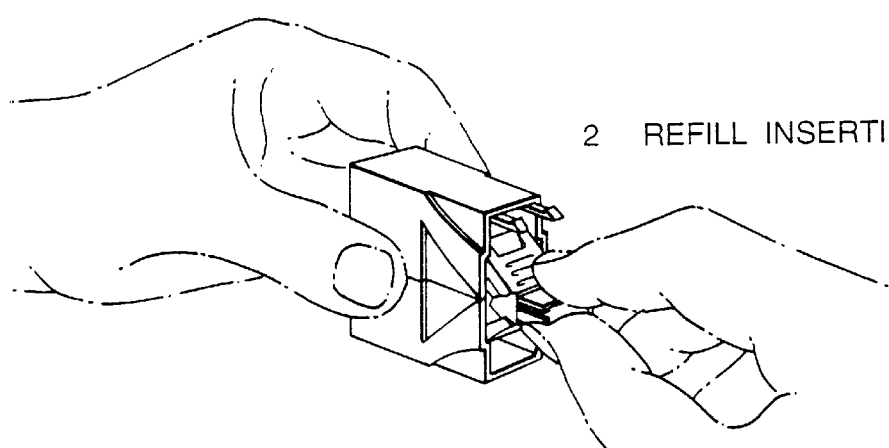
Figure 3:
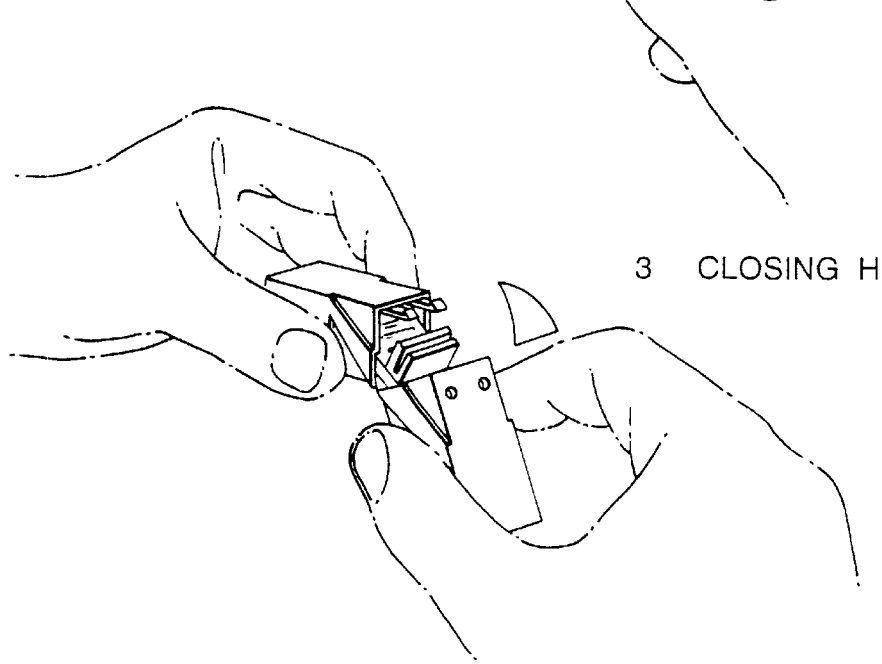
Figure 3:
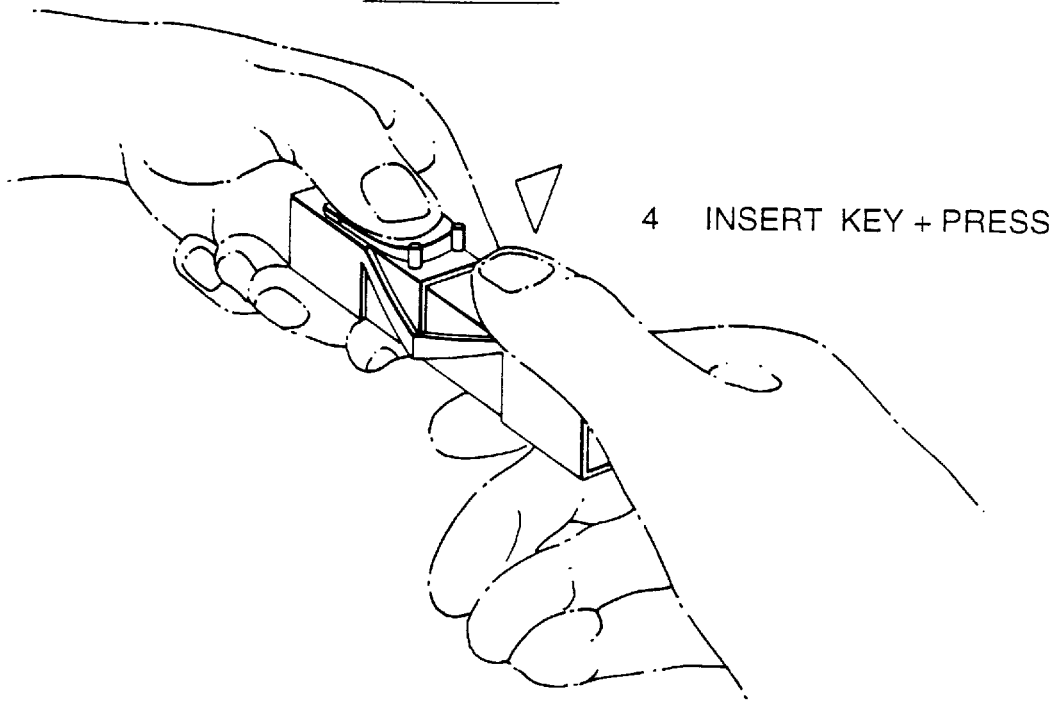
Figure 3:
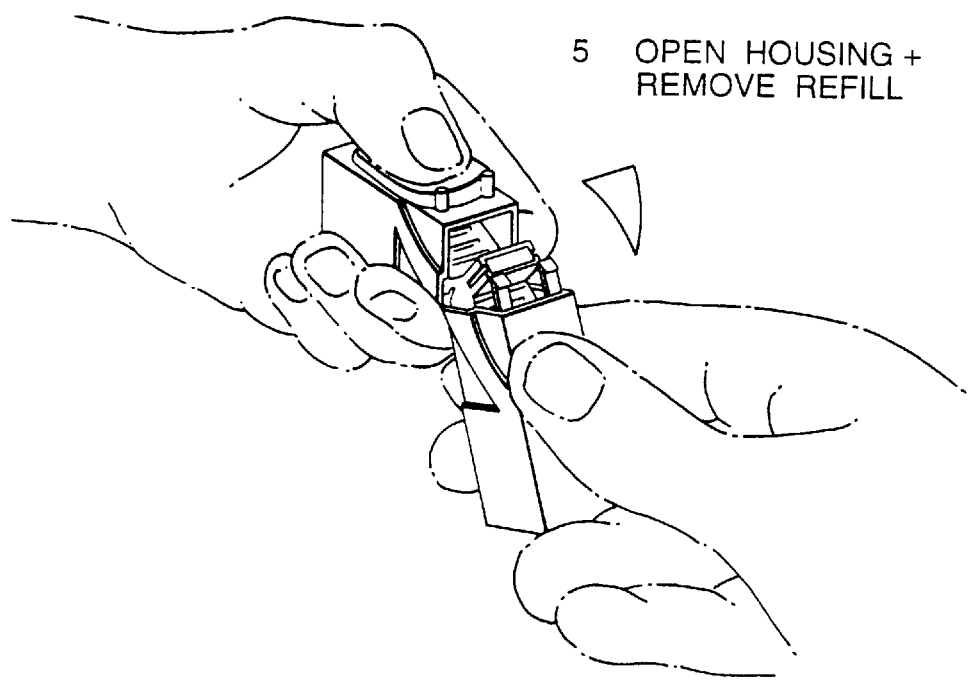

FIG. 3 illustrates the simple procedure for loading the refill body into the device and also for unloading the refill body.

In FIG. 4, typical dimensions of the device for the control of the German cockroach (*Blattella germanica*) are: a=10.5 cm, b=5 cm, h=0.8 cm, a1=12 cm, b1=6 cm but these dimensions may vary with the species and behavior of the target pest. A solid plastic casing (1) forms the walls and the roof of the device, which is fixed on a cardboard base (13). The interior ceiling (14) has a convex interior surface (15) such that the height between it and the cardboard base is about 0.7 centimeter at the entrance and the exit of the device (c), and about 0.2–0.3 centimeter at the center inside the device (d).

In FIG. 5, the interior ceiling (14) of FIG. 4, consists of a convex aluminium foil (16), where the exterior surface is the interior surface of the ceiling (15), which foil covers a cotton wool pad (17) located between (16) and a plastic backing (18). Structure (14) is fixed to the interior surface of the roof of the device.

In FIG. 6, the interior ceiling (15) consists of aluminium foil the convex shape of which is provided by fixing the foil over dental rolls (19) fixed on a cardboard base (20), to provide a specific minimum floor-to-ceiling distance within the tunnel. The ceiling is, however, unsupported between the edge of the roof and the lowest point. FIG. 6 also shows the treated surface (5). The dimensions of this device used for controlling *Blattella germanica*, are preferably of the order: i=1.7 cm, j=k=10 cm, m≧0.2 cm.

Activity Example

In laboratory tests, a single device according to the invention containing 0.3 g of a 5% w/w deltamethrin paste caused 100% kill of adult *Blattella germanica, Blatta orientalis* and *Periplaneta americana* cockroaches, from the susceptible laboratory strains, in a 1.1×1.1 m arena that contained harborage, food and water. Under identical conditions, using a strain of *Blattella germanica* which was 20 times more resistant to deltamethrin, 94% males and 50% females were killed overnight. In three dimensional (2.5× 2.5×2 m) arenas, with food, water and harborage, two devices caused a 50% reduction (100% males, 70% females and 30% nymphs) of a mixed age population of the susceptible *Blattella germanica* strain within 72 hours.

In field trials at two locations in an infested kitchen area, localized placement devices of the present invention, containing 0.3 g of a 5% w/w deltamethrin paste formulation reduced the *Blattella germanica* population by 60–95% after one week. The cockroach population was more than 20 times more resistant to deltamethrin than the laboratory strain.

I claim:

1. A device for the control of crawling pests, said device comprising:

a tunnel into which a crawling pest may enter, the tunnel having a floor, a ceiling and a gap between the floor and the ceiling, at least a portion of an interior surface of the tunnel ceiling treated with a suitable pest control agent, wherein the gap between floor and ceiling in a treated area progressively decreases in the direction of crawl; such that a pest entering the device may encounter said treated surface of said ceiling as a result of crawling into said progressively decreasing gap and receive upon contact with the treated surface a dose of the agent topically on the pest's upper parts.

2. A device according to claim 1 in which the floor of the tunnel is flat.

3. A device according to claim 2 in which at least a small floor-to-ceiling gap is maintained over substantially all of the treated area.

4. A device according to claim 2 in which the ceiling is convex.

5. A device according to claim 2 in which the ceiling is movable upon contact with the target pest.

6. A device according to claim 5 in which a compressible padding material is located between the interior and exterior surfaces of the ceiling adjacent to the movable surface.

7. A device according to claim 2 which, in order to limit user exposure to the pest control agent further comprises, at both ends of the tunnel, a portion of the interior surface of the ceiling which is not treated with the pest control agent.

8. A device according to claim 2 which further comprises baffles at each entrance which do not obstruct target pests entering the device.

9. A device according to claim 8 in which at least a small floor-to-ceiling gap is maintained over substantially all of the treated area, the ceiling is convex and movable on contact with the target pest and at both ends of the tunnel, a portion of the interior surface of the ceiling is free of the pest control agent.

10. A device according to claim 9 in which a compressible padding material is located between the interior and exterior surfaces of the ceiling adjacent to the movable surface.

11. A device according to claim 10 in which the treated portion is a light, deformable, movable structure that is suspended from the ceiling, and is not in contact with the floor of the device.

12. A device according to claim 9 in which the gap decreases from about 10 mm to about 2 mm.

13. A device according to claim 1 in which at least a small floor-to-ceiling gap is maintained over substantially all of the treated area.

14. A device according to claim 1 suitable for crawling insect control in which the gap decreases from about 10 mm to about 2 mm.

15. A device according to claim 1 in which the ceiling is convex.

16. A device according to claim 1 in which the ceiling is movable upon contact with the target pest.

17. A device according to claim 16 in which a compressible padding material is located between the interior and exterior surfaces of the ceiling adjacent to the movable surface.

18. A device according to claim 16 in which the treated portion is a light, deformable, movable structure that is suspended from the ceiling, and is not in contact with the floor of the device.

19. A device according to claim 1 which, in order to limit user exposure to the pest control agent further comprises, at both ends of the tunnel, a portion of the interior surface of the ceiling which is not treated with the pest control agent.

20. A device according to claim 1, wherein the portion of the interior surface of the tunnel ceiling is treated with the pest control agent such that the pest entering the device and encountering said decreasing gap receives upon contact with the treated surface a dose of the agent topically only on the pest's upper parts.

21. A device according to claim 1, wherein the tunnel is developed for localized pest-control placement within a human household.

22. A device according to claim 1, wherein the tunnel is developed for linking to form interconnected, modular tunnel structures.

23. A device according to claim 1, wherein the treated area is developed in the form of a replaceable refill body.

24. A device according to claim 23, wherein the tunnel comprises a section providing access to the interior of the tunnel for replacement of the refill body.

25. A device according to claim 1, wherein the pest control agent is applied to the treated area in the form of a film.

26. A device according to claim 1, wherein the pest control agent is applied to the treated area in a form selected from the group consisting of liquids, pastes, gels, and waxes.

27. A device according to claim 1, wherein the pest is dosed by direct contact between the pest control agent and the pest.

28. A device according to claim 1, wherein the gap decreases gradually in a direction along the length of the tunnel.

29. A device according to claim 1, wherein the pest control agent adheres to the tunnel ceiling and becomes flowable under a small shear stress provided directly by the pest's upper parts.

30. A device for control of crawling pests, the device comprising:
   a tunnel for localized placement in a human household and into which a crawling pest may enter, the tunnel having a floor, a ceiling, and a gap between the floor and the ceiling; and
   means for dosing a pest, the means for dosing being disposed adjacent the ceiling and treated with a suitable pest control agent, the means for dosing being developed so as to progressively restrict the size of the gap between the floor and the ceiling, such that a pest moving within the tunnel may encounter the means for dosing by crawling into a restricted portion of the gap and be dosed with the pest control agent topically on the pest's upper parts.

31. A device according to claim 30, wherein the pest control agent adheres to the tunnel ceiling and becomes flowable under a small shear stress provided directly by the pest's upper parts.

32. A device according to claim 30, wherein the tunnel is adapted for placement on horizonal and vertical surfaces.

* * * * *